US012574835B2

(12) United States Patent
Nix

(10) Patent No.: US 12,574,835 B2
(45) Date of Patent: Mar. 10, 2026

(54) PREDICTIVE DATA RATES FOR WIRELESS ROAMING AND SELECTION

(71) Applicant: Google LLC, Mountain View, CA (US)

(72) Inventor: Hayden Tadashi Nix, San Francisco, CA (US)

(73) Assignee: Google LLC, Mountain View, CA (US)

( * ) Notice: Subject to any disclaimer, the term of this patent is extended or adjusted under 35 U.S.C. 154(b) by 614 days.

(21) Appl. No.: 17/830,559

(22) Filed: Jun. 2, 2022

(65) Prior Publication Data

US 2023/0397098 A1     Dec. 7, 2023

(51) Int. Cl.
| | |
|---|---|
| *H04W 8/12* | (2009.01) |
| *H04W 24/10* | (2009.01) |
| *H04W 36/00* | (2009.01) |
| *H04W 36/08* | (2009.01) |
| *H04W 36/32* | (2009.01) |

(Continued)

(52) U.S. Cl.
CPC ............ *H04W 48/20* (2013.01); *H04W 8/12* (2013.01); *H04W 24/10* (2013.01); *H04W 36/00835* (2018.08); *H04W 36/08* (2013.01); *H04W 36/32* (2013.01); *H04W 48/02* (2013.01)

(58) Field of Classification Search
CPC . H04W 8/12; H04W 24/10; H04W 36/00835; H04W 36/08; H04W 36/24; H04W 36/30; H04W 36/304; H04W 36/32; H04W 48/02; H04W 48/20; H04L 12/00
See application file for complete search history.

(56) References Cited

U.S. PATENT DOCUMENTS

| | | | | |
|---|---|---|---|---|
| 5,815,811 A | * | 9/1998 | Pinard | H04W 48/20 |
| | | | | 455/434 |
| 7,447,176 B2 | * | 11/2008 | Ruan | H04W 48/20 |
| | | | | 370/332 |

(Continued)

FOREIGN PATENT DOCUMENTS

| | | | |
|---|---|---|---|
| WO | WO-2021063922 A1 | * | 4/2021 |
| WO | 2021242253 A1 | | 12/2021 |

OTHER PUBLICATIONS

Falkenberg, Robert , et al., "Discover Your Competition in LTE: Client-Based Passive Data Rate Prediction by Machine Learning", Published in: GLOBECOM 2017—2017 IEEE Global Communications Conference DOI: 10.1109/GLOCOM.2017.8254567, pp. 1-7.

(Continued)

*Primary Examiner* — Alpus Hsu
(74) *Attorney, Agent, or Firm* — Botos Churchill IP Law LLP

(57) ABSTRACT

The technology automatically selects a wireless network connection for a wireless device such as a laptop or a mobile phone based on predicted data rate. The wireless device is configured to receive physical and link layer measurements of access points. Based on the measurements, the wireless device predicts a data rate for each access point prior to forming a network connection therewith. The predicted data rate estimates a rate at which data is transferred from a transceiver of the wireless device to the access point once the wireless network connection is formed. The wireless device selects an access point with a highest predicted data rate, and the transceiver can then be instructed to form a connection with the selected access point.

25 Claims, 12 Drawing Sheets

(51) Int. Cl.
    *H04W 48/02*      (2009.01)
    *H04W 48/20*      (2009.01)

(56)           References Cited

U.S. PATENT DOCUMENTS

| | | | |
|---|---|---|---|
| 8,204,029 B2 * | 6/2012 | Stephenson | H04W 36/1446 |
| | | | 370/332 |
| 9,432,901 B1 * | 8/2016 | Kwan | H04W 36/008375 |
| 9,467,918 B1 * | 10/2016 | Kwan | H04W 24/10 |
| 9,497,680 B1 * | 11/2016 | Tran | H04W 36/302 |
| 9,565,610 B2 * | 2/2017 | Ibrahim | H04W 36/302 |
| 9,788,269 B2 * | 10/2017 | Gokhale | H04W 40/244 |
| 9,894,580 B1 * | 2/2018 | Chen | H04W 36/08 |
| 2004/0218608 A1 * | 11/2004 | Patiejunas | H04L 43/50 |
| | | | 370/395.21 |
| 2007/0091864 A1 | 4/2007 | Honjo et al. | |
| 2011/0019559 A1 * | 1/2011 | Gore | H04L 1/0029 |
| | | | 370/252 |
| 2013/0023271 A1 | 1/2013 | Ebara et al. | |
| 2013/0121180 A1 * | 5/2013 | Yang | H04W 48/16 |
| | | | 370/252 |
| 2014/0126388 A1 * | 5/2014 | Shin | H04W 48/20 |
| | | | 370/252 |
| 2015/0208227 A1 * | 7/2015 | El Moumouhi | H04W 8/02 |
| | | | 455/432.1 |
| 2016/0345256 A1 * | 11/2016 | Niranjan | H04W 36/302 |
| 2016/0353299 A1 * | 12/2016 | Sayeed | H04W 36/304 |
| 2017/0026888 A1 * | 1/2017 | Kwan | H04W 36/008375 |
| 2017/0111855 A1 * | 4/2017 | Cao | H04W 24/08 |
| 2018/0146400 A1 * | 5/2018 | Dayanandan | H04W 36/18 |
| 2018/0227927 A1 * | 8/2018 | Sun | H04W 72/542 |
| 2020/0304378 A1 * | 9/2020 | Choi | H04L 41/145 |
| 2021/0282085 A1 * | 9/2021 | Dunlap | H04W 48/20 |

OTHER PUBLICATIONS

Sliwa, Benjamin , et al., "Client-Based Intelligence for Resource Efficient Vehicular Big Data Transfer in Future 6G Networks", IEEE Transactions on Vehicular Technology, vol. 70, No. 6, Jun. 2021, pp. 5332-5346.

Sliwa, Benjamin , et al., "Empirical Analysis of Client-based Network Quality Prediction in Vehicular Multi-MNO Networks", arXiv:1904.10177v3 [cs.NI] Nov. 21, 2019, Published in: 2019 IEEE 90th IEEE Vehicular Technology Conference (VTC-Fall), pp. 1-7.

International Search Report and Written Opinion for corresponding International Application No. PCT/US2023/023538 dated Sep. 15, 2023 (15 pages).

* cited by examiner

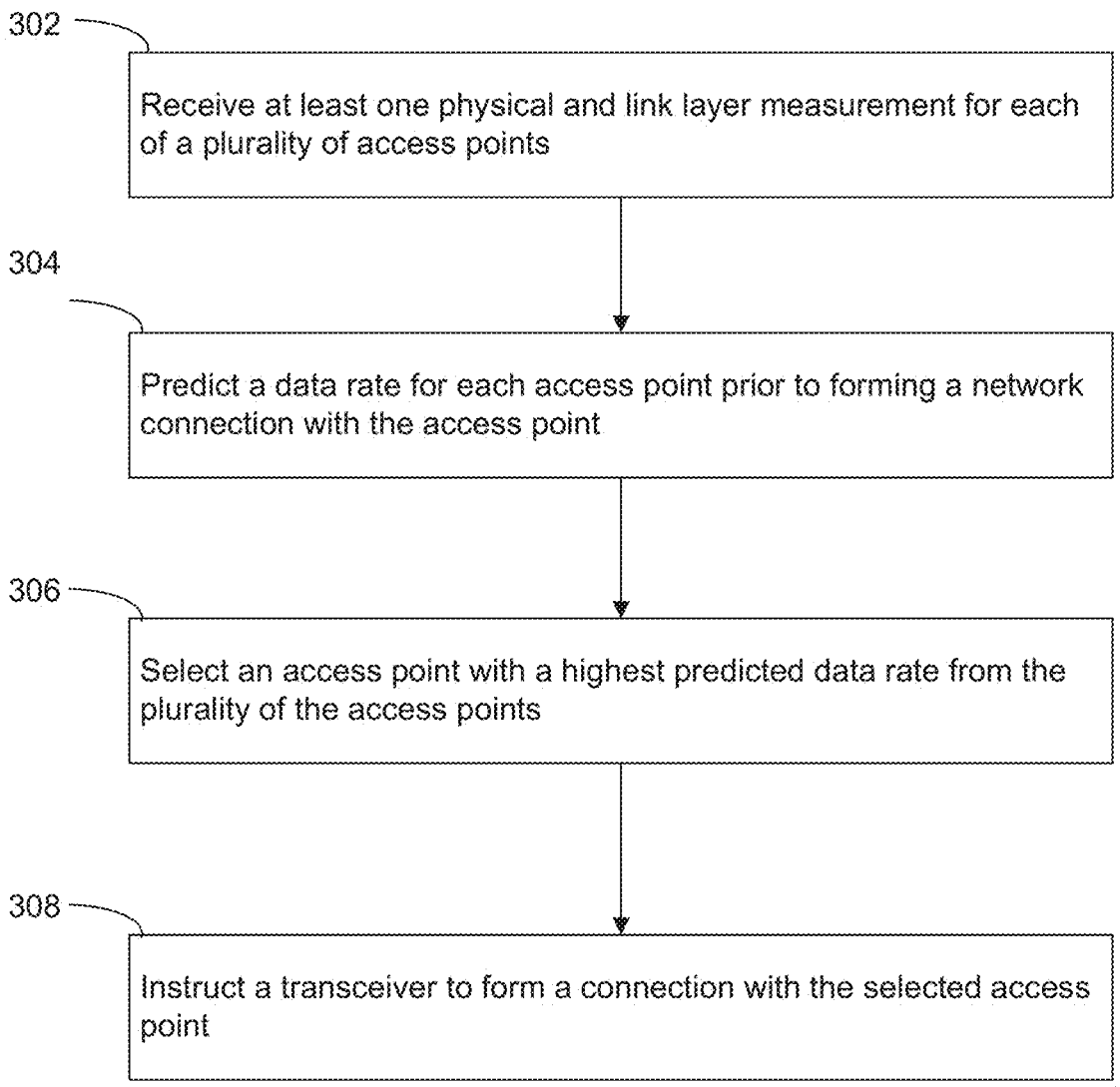

302

Receive at least one physical and link layer measurement for each of a plurality of access points

304

Predict a data rate for each access point prior to forming a network connection with the access point

306

Select an access point with a highest predicted data rate from the plurality of the access points

308

Instruct a transceiver to form a connection with the selected access point

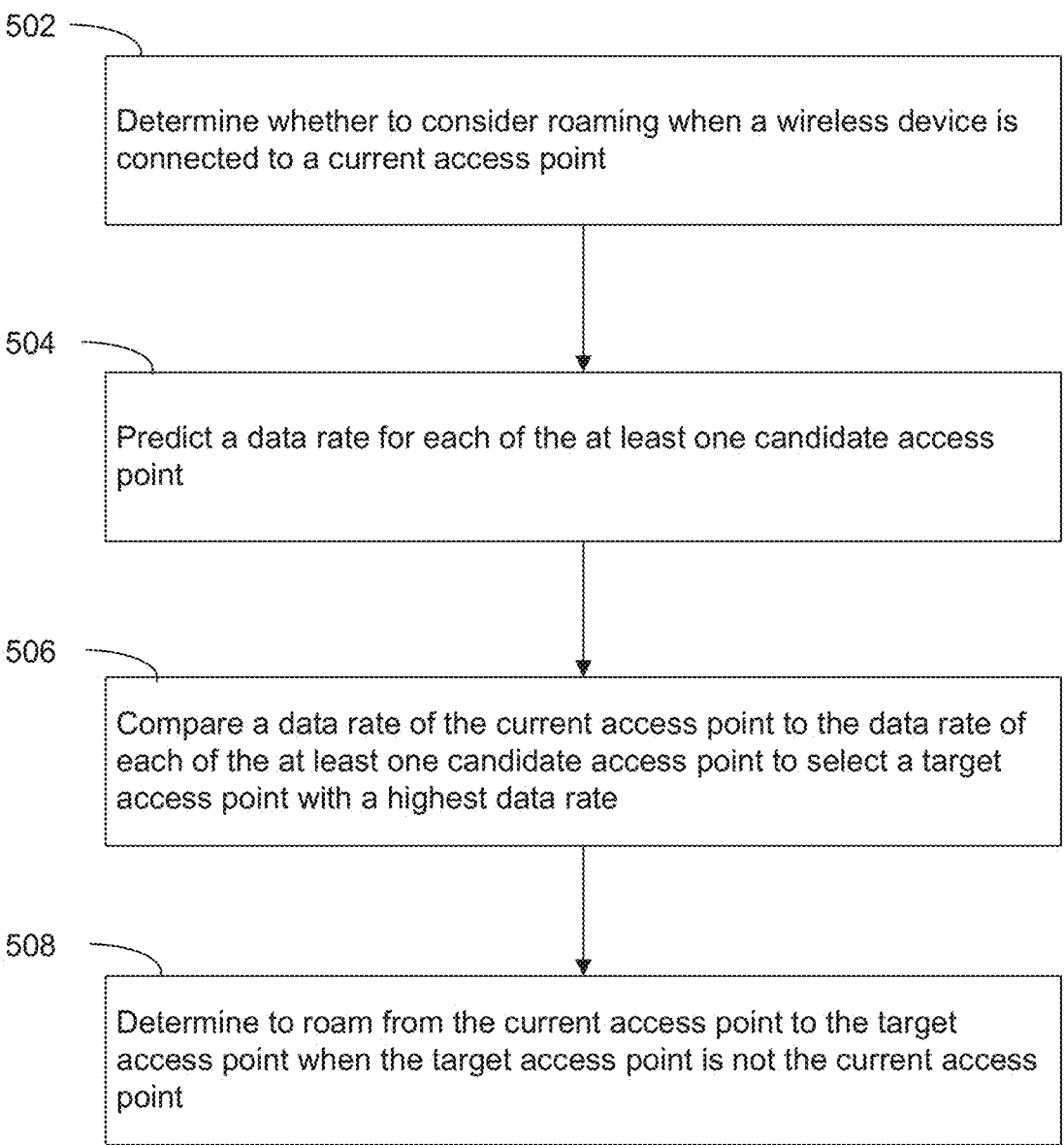

502 — Determine whether to consider roaming when a wireless device is connected to a current access point 504 — Predict a data rate for each of the at least one candidate access point 506 — Compare a data rate of the current access point to the data rate of each of the at least one candidate access point to select a target access point with a highest data rate 508 — Determine to roam from the current access point to the target access point when the target access point is not the current access point

FIG. 5

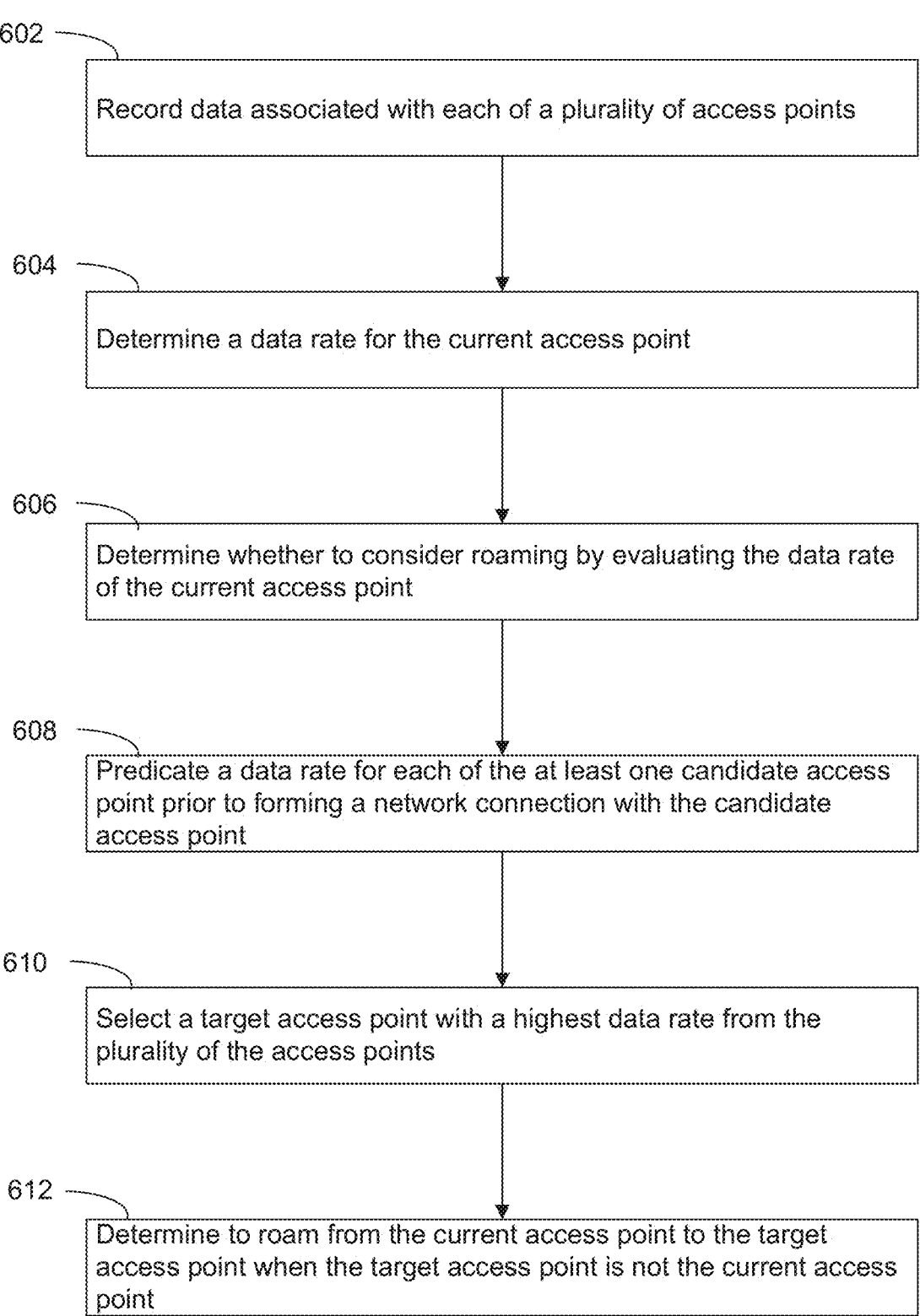

602

Record data associated with each of a plurality of access points

604

Determine a data rate for the current access point

606

Determine whether to consider roaming by evaluating the data rate of the current access point

608

Predicate a data rate for each of the at least one candidate access point prior to forming a network connection with the candidate access point

610

Select a target access point with a highest data rate from the plurality of the access points

612

Determine to roam from the current access point to the target access point when the target access point is not the current access point

FIG. 6

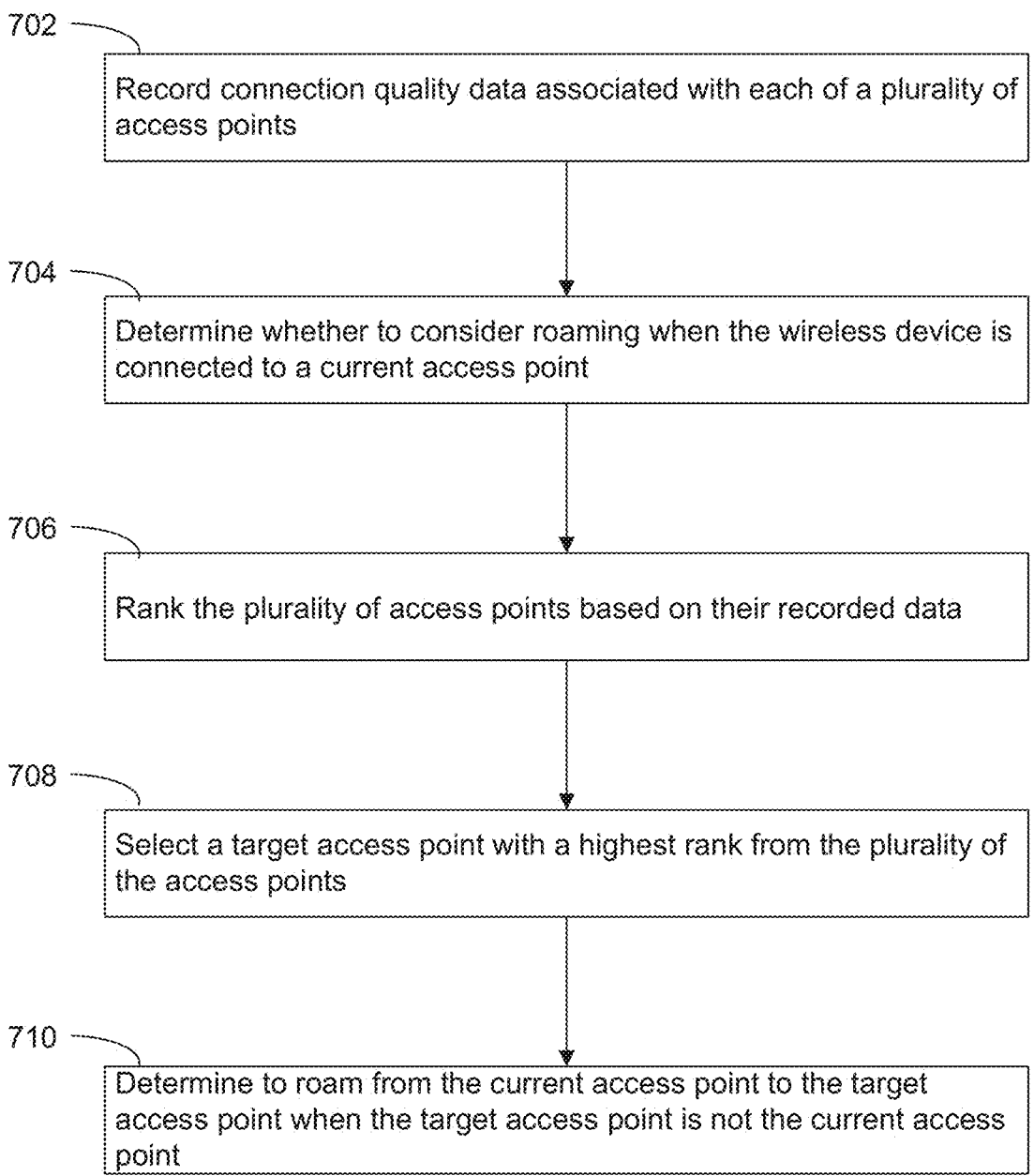

702 — Record connection quality data associated with each of a plurality of access points 704 — Determine whether to consider roaming when the wireless device is connected to a current access point 706 — Rank the plurality of access points based on their recorded data 708 — Select a target access point with a highest rank from the plurality of the access points 710 — Determine to roam from the current access point to the target access point when the target access point is not the current access point

PREDICTIVE DATA RATES FOR WIRELESS ROAMING AND SELECTION

CROSS-REFERENCE TO RELATED APPLICATIONS

This application is related to co-pending application Ser. No. 17/830,537, filed Jun. 2, 2022 and entitled System and Method for Wireless Roaming, the entire disclosure of which is incorporated herein by reference.

BACKGROUND

Making good network or access point selection decisions is crucial for client computing devices that typically operate wirelessly, such as tablets, netbooks or other laptops, or mobile phones, which rely on network connectivity to access information or stream content. In most populated environments, multiple networks may be visible to a wireless device, and many of those networks may have multiple access points for a given location. There are two primary situations during which a wireless device must decide which wireless connection to initiate: automatic network selection and roaming. Automatic network selection or auto-connect occurs when a non-connected wireless device selects a network and specific access point within that network to connect with. Wireless roaming occurs when a wireless device transitions from one access point to another, or one network to another, which may involve seeking better performance such as with a stronger signal or lower communication error rate. Both situations face the same challenge—deciding which network and access point is the "best".

To select a network, existing approaches may compare physical attributes of connection options. This can involve scoring each option based on its signal strength, signal-to-noise (SNR) ratio, wireless channel, frequency band, or some combination of these. The decision may be made simply by selecting the option with the highest signal strength. However, these physical attributes are not always good proxies for wireless performance. Signal strength or signal-to-noise ratio does not dictate actual connection performance. A higher signal strength or signal-to-noise ratio in one connection option does not guarantee a higher throughput than another connection. In fact, connection performance cannot be evaluated until the connection is actually established. As a result, existing approaches may lead to technical problems, such as poor network or access point selections, resulting in suboptimal connections, unreliable connectivity, and/or unexpected user experiences such as due to insufficient buffering for a streaming app, frozen video on a conference call or timeouts waiting for browser search results.

BRIEF SUMMARY

Aspects of the disclosure provide a technical solution to the technical problems present in network and/or access point selections. The technical solution disclosed herein evaluates potential connections and uses predicted data rates to make informed network and access point selection decisions. A prediction system can employ a plurality of different machine learning models for predicting data rates. For instance, there may be a machine learning model associated with each firmware and hardware combination for different types of wireless devices. This can enable a wireless computing device to avoid selecting access points that might have buffering, timeout or other connectivity issues.

According to one aspect, a network selection method is provided. The method comprises: receiving, by one or more processors of a wireless device, at least one physical and link layer measurement for each of a plurality of access points, each access point providing wireless network coverage to a location of the wireless device; predicting, by the one or more processors, a data rate for each access point prior to forming a wireless network connection with the access point, the predicted data rate estimating a rate at which data is transferred from the wireless device to the access point once the network connection is formed; selecting, by the one or more processors, an access point with a highest predicted data rate from the plurality of the access points; and instructing a transceiver of the wireless device to form a connection with the selected access point.

In one example, the method further comprises performing a roam scan to gather the at least one physical and link layer measurement for each of the plurality of access points. Predicting the data rate for each access point may be based on the at least one physical and link layer measurement for each access point. The at least one physical and link layer measurement may include one or more of: signal strength, frequency band, mode, signal strength velocity, signal-to-noise ratio or historical data. In another example, the method may further comprise storing, in memory of the wireless device, pre-processed information indicating a relationship between a given data rate and at least one physical and link layer measurement detected at a time when the given data rate is determined. Predicting the data rate for each access point may be based on the at least one physical and link layer measurement associated therewith and the pre-processed information.

The predicted data rate may approximate a data rate selected by a firmware of the wireless device. The data rate may be selectable when the wireless network connection is formed with the access point. Predicting the data rate for each access point may be done using a machine learning model trained on the pre-processed information. The pre-processed information may include testing data and production data. In one example, the wireless device may be connected to a current access point. The method may further comprise: determining a current data rate at which data is transferred from the wireless device to the current access point; comparing the highest predicted data rate to the current data rate; and instructing the transceiver of the wireless device to form a connection with the selected access point when the highest predicted data rate is higher than the current data rate.

According to another aspect, a method for determining roaming of a wireless device is provided. The method comprises: determining, by one or more processors of the wireless device, whether to consider roaming when the wireless device is connected to a current access point, the wireless device being within a network coverage area of a plurality of access points, the plurality of access points including the current access point and at least one candidate access point; predicting, by the one or more processors, a data rate for each candidate access point prior to forming a network connection with a selected one of the at least one candidate access points, the predicted data rate estimating a rate at which data would be transferred from the wireless device to each respective candidate access point once the network connection is formed; comparing, by the one or more processors, a data rate of the current access point to the predicted data rate of each candidate access point to select a target access point with a highest data rate; and determining, by the one or more processors, to roam from the current access point to the target access point when the target access point is not the current access point. In one example, the method may further comprise roaming, by a transceiver of the wireless device, from the current access point to the target access point when the target access point is not the current access point.

Predicting the data rate for each of the at least one candidate access point may be based on at least one physical and link layer measurement associated therewith. The at least one physical and link layer measurement may include one or more of: signal strength, frequency band, mode, signal strength velocity, signal-to-noise ratio or historical data. The method may further comprise performing a roam scan to gather the at least one physical and link layer measurement for each of the at least one candidate access point. In one example, determining whether to consider roaming may include comparing the data rate of the current access point to a threshold.

The method may further comprise storing, in memory of the wireless device, pre-processed information indicating a relationship between a given data rate and at least one physical and link layer measurement detected at a time when the given data rate is determined. Predicting the data rate for each candidate access point may be done using a machine learning model trained on the pre-processed information, the pre-processed information including testing data and the production data. Predicting the data rate for each of the at least one candidate access point may be based on at least one physical and link layer measurement associated therewith and the pre-processed information.

In one example, determining whether to consider roaming may include evaluating at least one of the following: signal strength of the current access point, a system requirement of the wireless device, an application currently running on the wireless device, and historical connection performance.

A further aspect provides a wireless device within a network coverage area of a plurality of access points. The wireless device comprises: a transceiver; and one or more processors operatively coupled to the transceiver. The one or more processors may be configured to: receive at least one physical and link layer measurement for each of the plurality of access points; predict a data rate for each access point prior to forming a network connection with the access point, the predicted data rate estimating a rate at which data is transferred from the transceiver to the access point once the network connection is formed; select an access point with a highest predicted data rate; and instruct the transceiver to form a wireless connection with the selected access point.

In one example, the one or more processors may be configured to: performing a roam scan to gather the at least one physical and link layer measurement for each of the plurality of access points. The one or more processors may predict the data rate for each access point based on the at least one physical and link layer measurement for each access point. The at least one physical and link layer measurement may include one or more of: signal strength, frequency band, mode, signal strength velocity, signal-to-noise ratio or historical data.

Yet another aspect provides a wireless device within a network coverage area of a plurality of access points. The wireless device comprises: a transceiver; and one or more processors operatively coupled to the transceiver. The one or more processors may be configured to: determine whether to consider roaming when the transceiver is connected to a current access point of a plurality of access points, the plurality of access points including the current access point and at least one candidate access point; predict a data rate for each candidate access point prior to forming a network connection with a selected one the candidate access points, the predicted data rate estimating a rate at which data would be transferred from the transceiver to each respective candidate access point once the network connection is formed; compare a data rate of the current access point to the predicted data rate of each candidate access point to select a target access point with a highest data rate; and determine to roam from the current access point to the target access point when the target access point is not the current access point.

In one example, the one or more processors may be further configured to instruct the transceiver to roam from the current access point to the target access point when the target access point is not the current access point. The one or more processors may be configured to predict the data rate for each of the at least one candidate access point based on at least one physical and link layer measurement associated therewith.

BRIEF DESCRIPTION OF THE DRAWINGS

FIG. 3 illustrates a flow diagram showing an exemplary method for network selection in accordance with aspects of the disclosure.

FIG. 5 illustrates a flow diagram showing an exemplary method for deciding roaming in accordance with aspects of the disclosure.

FIG. 6 illustrates a flow diagram showing another exemplary method for deciding roaming in accordance with aspects of the disclosure.

FIG. 7 illustrates a flow diagram showing yet another exemplary method for deciding roaming in accordance with aspects of the disclosure.

FIG. 8 illustrates an example visualization 800 for a non-linear multivariate regression model, in accordance with aspects of the disclosure.

DETAILED DESCRIPTION

Figure 1:
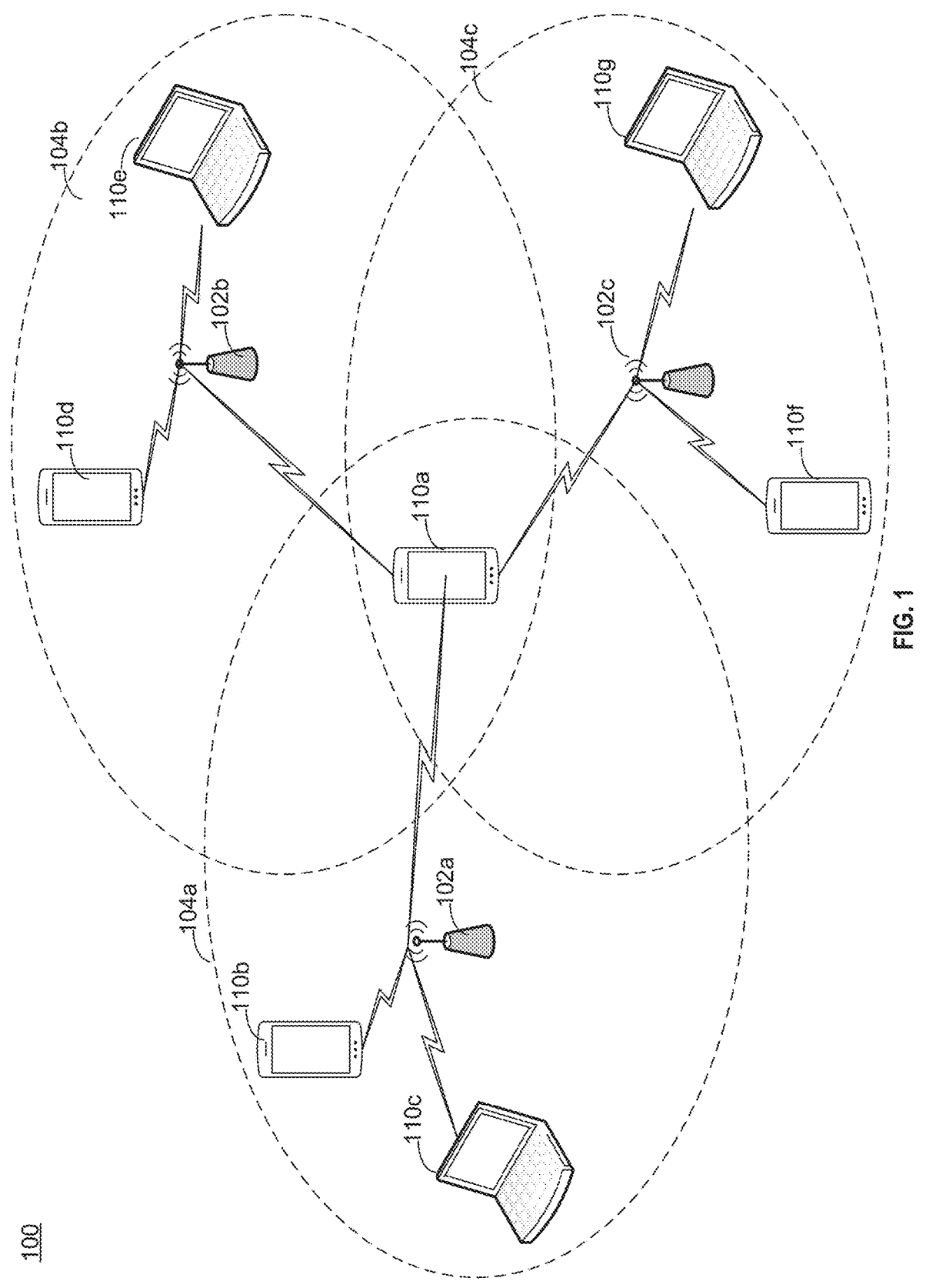
FIG. 1 illustrates an example access point environment that supports wireless connections in accordance with various aspects of the present disclosure.

Aspects of the technology employ predictive data rates to make network and/or access point selections by a wireless computing device. This may include modeling various firmware and hardware combinations that evaluate various characteristics and performance of communication links. The result is a reliable approach for selecting the network and/or access point, thereby providing a performant wireless experience to the user. One embodiment of the technical solution performs automatic network selection, which includes predicting a data rate for each access point within a wireless communication range of the wireless computing device, selecting an access point with the highest predicted data rate, and automatically forming a connection with the selected access point. Another embodiment of the technical solution automatically makes a roaming decision about whether to roam from a current access point that the wireless computing device is currently connected with, which includes predicting a data rate for each candidate access point, comparing a data rate of the current access point to the predicted data rates of the candidate access points, selecting a target access point with the highest data rate, and determining to roam to the target access point if the target access point is not the current access point. The technical solution enables the wireless device to avoid buffering or timeout issues, and flexibly supports different product builds with firmware/ hardware configurations. The technical solution provides a reliable and accurate approach to select a network and/or access point to ensure a performant wireless experience to the user. The technical solution may benefit any project, wireless device or device that implements automatic network selection and Wi-Fi roaming. The present technology will now be described with respect to the following exemplary systems and methods.

The term "access point" or "AP" is used to denote a device through which wireless devices can connect to a basic service set ("BSS") within a wireless network. The term "current access point" is used to denote the access point that a wireless device is currently part of. The term "candidate access point" is used to denote an available access point that a wireless device is capable of connecting with. The candidate access point may include the current access point. Wireless devices may include a user's mobile phone, their tablet, netbook or other laptop PC, a wearable device (e.g., a smartwatch or head-mounted display), etc. The term "basic service set" or "BSS" is used to denote a subset of a network including one access point and its associated wireless devices. The term "extended service set" or "ESS" is used to denote one or more BSSs forming a larger, single network. The term "roaming" used herein describes when a wireless device moves from one BSS to another within an ESS, unless otherwise specified. The term "current BSS" is used to denote the BSS that a wireless device is currently part of. The term "candidate BSS" is used to denote an available BSS that a wireless device is capable of joining. The candidate BSS may include the current BSS. The term "non-candidate BSS" is used to denote a BSS that is not current or candidate. The term "exponentially weighted moving average" or "EWMA" is used to denote a technique used to average time series data where older data are given exponentially lower weights. This technique can be used to smooth volatility in time series data, especially when the measurement itself has uncertainty.

1. Overview

FIG. 1 illustrates an example access point environment 100 that supports roaming in accordance with aspects of the present disclosure. The access point environment 100 may include a plurality of access points 102a, 102b, and 102c, each having its own corresponding BSS 104a, 104b or 104c. Each access point or BSS may provide network coverage to one or more wireless devices positioned within the corresponding geographic coverage area. For instance, a first access point 102a or its corresponding BSS 104a may provide network coverage to wireless devices 110a, 110b, and 110c. A second access point 102b or its corresponding BSS 104b may provide network coverage to wireless devices 110a, 110d and 110e. A third access point 102c or its corresponding BSS 104c may provide network coverage to wireless devices 110a, 110f and 110g. Each wireless device may be configured to connect to an access point or BSS. Coverage areas of different access points or BSSs may overlap. A wireless device at an overlapped area may form a connection with any of the overlapping access points or BSSs. For example, as illustrated in FIG. 1, the wireless device 110a may communicate with any one of the access points 102a, 102b and 102c or corresponding BSSs (e.g., first BSS 104a, the second BSS 104b and the third BSS 104c). Different arrangements in other examples are possible.

2. BSS Data Rate Prediction System

Figure 2:
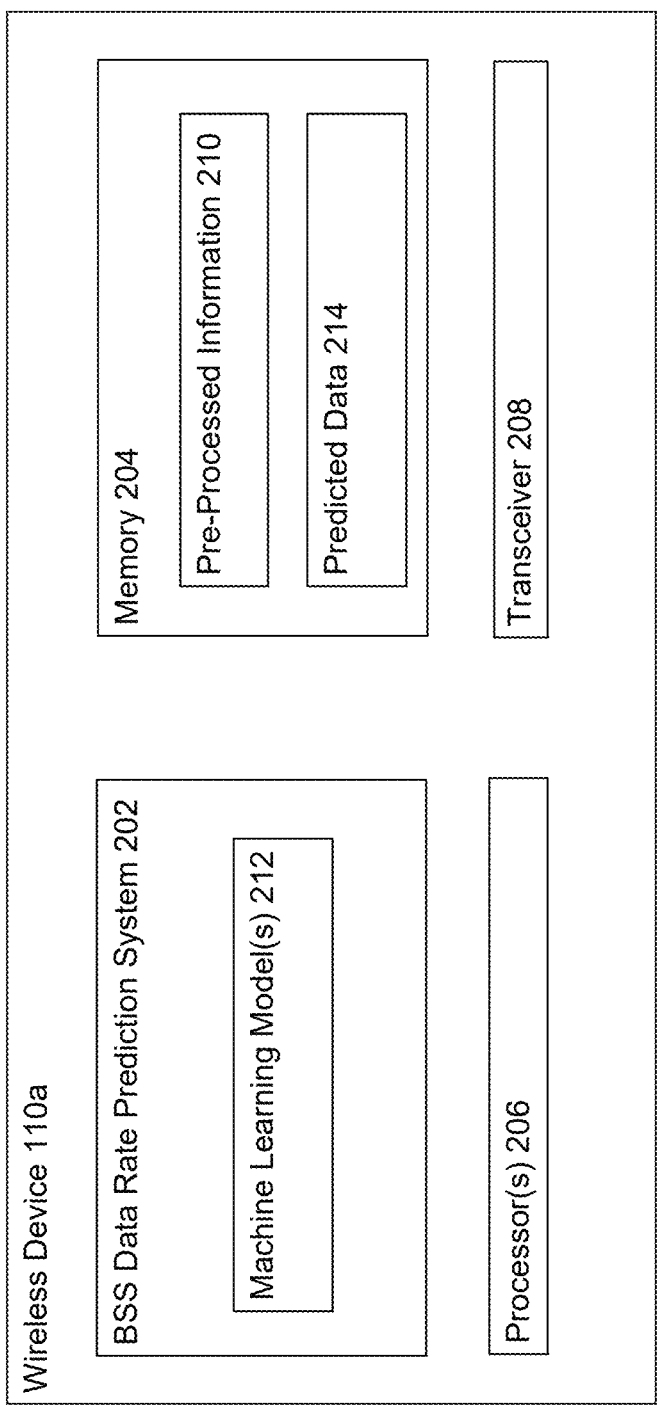
FIG. 2 illustrates a functional diagram of an example wireless device including a system for predicting data rates in accordance with aspects of the disclosure.

Referring to FIG. 2, the wireless device 110a may include a BSS data rate prediction system 202. The prediction system 202 may be implemented by instructions stored in memory 204. Modules and instructions within the prediction system 202 may be executable by one or more processors 206. The prediction system 202 may predict a data rate for an access point or BSS prior to forming a network connection between the wireless device 110a and the BSS's access point. The data rate may refer to a physical layer (PHY) rate. "Data rate" and "PHY rate" may be used interchangeably in this document. The data rate may represent the speed at which data is transferred between the wireless device and the access point of the BSS. The data rate may be measured in, e.g., megabits per second (Mbps). The data rate may serve as a performance measure of the access point or BSS, indicating its physical layer connection quality. The higher the data rate, the better the connection quality of the access point or BSS. For example, an access point or BSS with a data rate of 400 Mbps is more performant than an access point or BSS with a data rate of 200 Mbps.

The data rate may refer to the rate that data is transferred from the wireless device to the access point of the BSS, namely, the transmit (TX) data rate. In one example, the TX rate may refer to the transmit physical layer (TX PHY) data rate. The TX PHY data rate may not be known until the firmware of the wireless device selects this data rate after a connection is established between the wireless device and the access point or BSS. In conventional arrangements, algorithms used by the firmware to select the data rate may be complex and proprietary. In such arrangements, upper layers of the WLAN stack may not have insights as to how the firmware selects the data rate, and may not predict how the firmware will select the data rate prior to forming the connection.

Unlike existing approaches, the prediction system 202 is configured to predict the data rate of an access point or BSS prior to forming a network connection between the wireless device 110a and the access point of the BSS. The predicted data rate may closely approximate the data rate that the firmware running on the wireless device 110a would select upon forming the connection with the access point or BSS. The prediction system 202 may predict the data rate for an access point or BSS based on data associated with the access point or BSS, including one or more of the following: signal strength, signal strength velocity, signal-to-noise ratio (SNR), frequency band, 802.11 mode, and historical data, among other possibilities. The signal strength may refer to exponentially weighted moving average (EWMA) signal strength, may be measured in decibels per milliwatt (dBm). The SNR may refer to EWMA SNR. The signal strength velocity may refer to a rate of change of the EWMA signal strength over time, and may be measured in dBm/s. The 802.11 mode may refer to the Wi-Fi standard under which the access point is operating, which determines the theoretical maximum speed of the connection. Historical data may include any of the above data gathered over some duration of time. Some of the above data may be gathered when the access point or BSS is observed via one or more roam scans. Roam scans allow the client device to observe the signal characteristics of the access point or BSS, including signal strength, frequency band, and signal-to-noise ratio, as well as the 802.11 mode. Multiple roam scans allow the client device to calculate change in signal strength over time, or signal strength velocity. In one example, the wireless device 110a may perform a burst of several active scans targeting one or more access points or BSSs to gather time series data for EWMA and velocity calculations of each access point or BSS.

2.1 Machine Learning Model

The prediction system 202 may implement one or more machine learning models 212 to perform data rate prediction. According to one aspect, the model(s) 212 may be a multivariate non-linear regression model(s). The machine learning model(s) 212 may employ, by way of example, a Transformer-type architecture, a convolutional neural network (CNN), recurrent neural network (RNN), long short-term memory (LSTM) network or combination thereof. Other machine learning architectures may be used, so long as they support multivariate non-linear regression. The machine learning model 212 may be trained with pre-processed information 210, including, for example, testing data and production data. As shown in FIG. 2, the pre-processed information 210 may be stored in the memory 204.

There may be different types of pre-processing. In one example, pre-processing may include filtering out idle rates. When a device does not have data to be sent, its rate can drop to some idle value. Those idle rates may not be representative of the true link capacity. Pre-processing may be used to filter out such idle rates, if they have not been removed beforehand. As a result, the machine learning model(s) 212 may be trained with data sets that do not contain idle rates.

Training the machine learning model(s) 212 may comprise inputting sets of physical attribute values from training examples in the pre-processed data into the machine learning model(s) 212 and processing them to generate, for each set of physical attribute values, a respective predicted data rate. Each predicted data rate is compared to a corresponding ground truth data rate in the pre-processed data, for example using a loss function, such as an L2 loss function. Based on the comparison, parameters of the machine learning model(s) 212 are updated. For example, an optimization procedure, such as stochastic gradient descent, may be applied to the loss function to determine the parameter updates. The process of updating the parameters of the machine learning model(s) 212 may be iterated until a threshold condition is satisfied, such as a threshold number of training epochs and/or a threshold performance on a test dataset being reached.

The testing data may refer to data gathered through tests before a product launch. The testing data may include physical attribute values of a BSS and the corresponding data rate selected by a test wireless device when connected to an access point of the BSS. The testing data may be gathered from tests performed on wireless devices with different hardware. Hardware tests may include rate versus range tests, and bespoke PHY rate tests, among others. In one example, during an automated test, a test wireless device may be repeatedly connected to an access point of a BSS with a different permutation of physical attribute values. The physical attributes may represent radio frequency attributes of a connection. The physical attributes may include, but are not limited to, signal strength, signal strength velocity, SNR, frequency band, mode and/or wireless channel. After each connection, the physical attribute values as well as the data rate selected by the firmware of the test wireless device may be added to the pre-processed information for training the machine learning model 212.

The production data may refer to data gathered after a product launch. The production data may include metrics of an access point or BSS and corresponding data rate selected by a firmware of a wireless device when connected to the access point of the BSS. The production data may be gathered from wireless devices in the field. By way of example, when a wireless device connects to an access point or BSS, the wireless device may record the data rate selected by its firmware as well as a metric of the access point or BSS connection statistics at the time when the data rate is selected. The metric may include radio frequency measurements of the access point or BSS connection. The metric may include, but not limited to, signal strength, SNR, frequency band, mode, noise, and wireless channel, among others. The selected data rate as well as the metric of the access point or BSS connection statistics may then be added to the pre-processed information for training the machine learning model 212. This may be done periodically or upon request for one or more devices operating in the field. The machine learning model(s) 212 may be trained at the wireless device, or may be trained by a backend system and then sent to the wireless device for use by the prediction system 202. An example machine learning training architecture is described further below.

Once trained using the pre-processed information, the machine learning model 212 may be used by the prediction system 202 to predict the data rate of an access point or BSS, even before the wireless device 110a forms a network connection with the access point or BSS. The predicted data rate may indicate the firmware running on the wireless device 110a would choose if the wireless device 110a were to connect with the access point or BSS. The predicted data 214 may be stored in the memory 204. The machine learning model 212 may predict the data rate based on one or more physical and link layer measurements of the access point or BSS. Physical layer may refer to open systems interconnection (OSI) model physical layer, and measurements of which may include signal strength and frequency, among others. Link layer measurements may include 802.11 mode and data rate, among others. Physical and link layer measurements may include one or more of the following data related to the access point or BSS obtained through one or more roam scams: signal strength, SNR, frequency band, wireless channel, and mode, among others. In one example, the machine learning model 212 may predict the data rate based on either the signal strength or SNR, or a combination thereof. By relying on the signal strength and the signal noise ratio, either alone or in combination, the machine learning model 212 may generate an accurate prediction of the data rate.

The data rate predicted by the machine learning model 212 may represent a direct, objective measurement of the potential performance of the access point or BSS, serving as an indicator for potential connection quality of the access point or BSS.

2.2 Network Selection Process Based on Predicted Data Rates

In one example, the wireless device 110a may engage an automatic network selection process. During this process, the wireless device 110a may automatically perform a roam scan to capture data or physical and link layer measurements of each surrounding access point or BSS. The prediction system 202 may predict a data rate for each access point or BSS based on its physical and link layer measurement, and compare all access points or BSSs based on their predicted data rates. To ensure that the wireless device 110a would receive the best connection quality, the prediction system 202 may select the access point or BSS with the highest predicted data rate, and instruct a transceiver 208 to establish a connection with the selected access point or BSS.

FIG. 3 presents a flow chart depicting an exemplary automatic network selection process based on predicted data rates. At 302, one or more processors 206 of the wireless device 110a may receive at least one physical and link layer measurement for each of a plurality of access points or BSSs via transceiver 208. Each access point or BSS may provide network coverage to where the wireless device 110a resides. At 304, the processor(s) 206 may predict a data rate for each access point or BSS prior to forming a network connection with a given access point or BSS. The predicted data rate may estimate a rate at which data would be transferred from the wireless device 110a, or the transceiver 208 of the wireless device 110a, to the access point or BSS once the network connection is formed. At 306, the processor(s) 206 may select a BSS with a highest predicted data rate from the plurality of the access points or BSSs. At 308, the processor(s) 206 may instruct a transceiver to form a connection with the selected access point or BSS.

The data rate may be a physical layer rate. The processor(s) 206 may perform a roam scan to gather the at least one physical and link layer measurement for each of the plurality of access points. The processor(s) 206 may predict the data rate for each access point based on the at least one physical and link layer measurement for each access point. The at least one physical and link layer measurement may include one or more of the following: signal strength, frequency band, mode, signal strength velocity, signal-to-noise ratio and historical data. The memory 204 may store pre-processed information indicating a relationship between a data rate and at least one physical and link layer measurement detected at the time when the data rate is determined. The processor(s) 206 may predict the data rate for each access point or BSS based on the at least one physical and link layer measurement associated with the access point or BSS and the pre-processed information. The predicted data rate may approximate a data rate selected by a firmware of the wireless device, wherein the firmware selects the data rate when the wireless network connection is formed with the access point.

In one embodiment, the wireless device may be connected to a current access point. The processor(s) 206 may determine a current data rate at which data is transferred from the wireless device to the current access point. The processor(s) 206 may compare the highest predicted data rate to the current data rate. The processor(s) 206 may instruct the transceiver of the wireless device to form a connection with the selected access point when the highest predicted data rate is higher than the current data rate.

2.3 Other Embodiments of Machine Learning Model

In some examples, the prediction system 202 may have a plurality of different machine learning models 212 for predicting data rates. For instance, the prediction system 202 may have a machine learning model 212 for each firmware and hardware combination of wireless devices, or for each device class. Given a device class of the wireless device 110a (e.g., laptop, smartphone, smart speaker, smart display, etc.), the prediction system 202 may select a suitable machine learning model 212 to perform data rate prediction.

Different machine learning models may be used for different physical environments. For example, one machine learning model may predict data rates for outdoor connections, such as in the case when the wireless device 110a is positioned in an outdoor environment. Another machine learning model may predict data rates for indoor connections, such as in the case when the wireless device 110a is positioned in an indoor environment.

In another example, the prediction system 202 may implement a machine learning model that predicts a data rate for each access point or BSS, and calculates a score for each access point or BSS based on the predicted data rate. The machine learning model 212 may adjust the score by taking into account different situations. For example, signal strength and/or SNR of an access point or BSS may vary widely depending on whether the wireless device 110a is positioned indoor or outdoor. The machine learning model may increase the score of the access point or BSS if the wireless device 110a is positioned outdoors, and decrease the score if the wireless device 110a is positioned indoor (or vice versa, depending on the scenario). The prediction system 202 may compare access points or BSSs based on their scores, and select the access point or BSS with the highest score to form a connection.

In yet another example, the prediction system 202 may have different machine learning models for different connection scenarios. For instance, the prediction system 202 may have a first machine learning model for predicting data rates of all surrounding access points or BSSs when the wireless device 110a is not connected to any access point or BSS, as discussed in Section 2.2. The prediction system 202 may have a second machine learning model for predicting data rates during a roaming determination process. When the wireless device 110a is connected to a current access point or BSS, the wireless device 110a may assess roaming needs by determining if there is any other access point or BSS that would provide a better connection quality than the current access point or BSS. The second machine learning model may predict the data rate for each candidate access point or BSS. The predicted data rates of candidate access points or BSSs may then be compared to a data rate of the current access point or BSS to determine if there is any candidate access point or BSS that exceeds the performance of the current access point or BSS, in which case the wireless device 110a may choose to roam from the current access point or BSS to the candidate access point or BSS. An example implementation approach for making roaming decisions is provided in Section 3 below.

3. Improved BSS Evaluation System

Figure 4A:
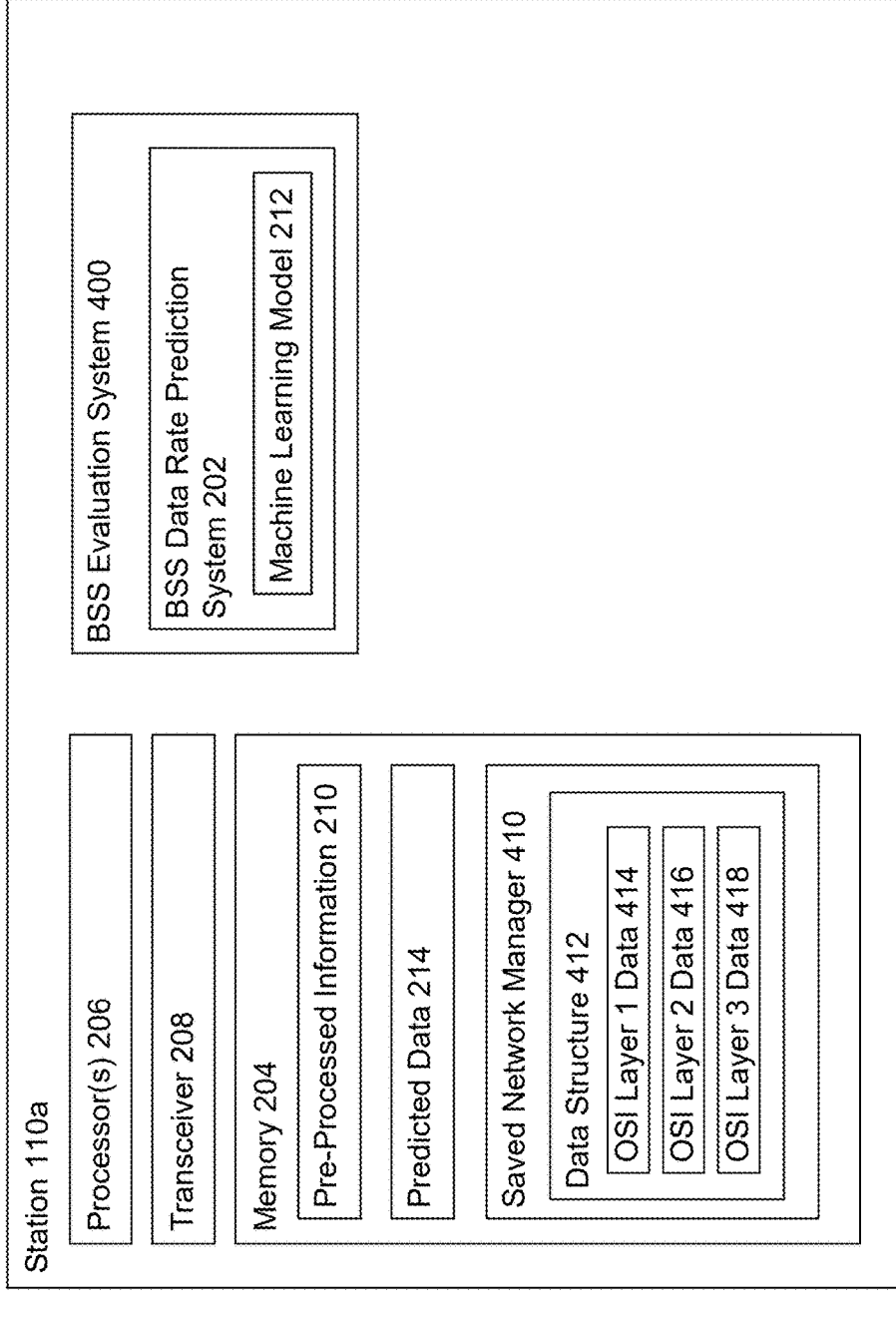
FIG. 4A illustrates a functional diagram of another example wireless device including a system for deciding roaming in accordance with aspects of the disclosure.

FIG. 4A illustrates another embodiment 400a of the wireless device 110a, in which the BSS data rate prediction system 202 may form part of a BSS evaluation system 400 for making roaming decisions. The wireless device 110a may make roaming decisions when it is currently connected to an access point or BSS. For example, initially, the transceiver 208 of the wireless device 110a may establish a connection with a first access point to join a first BSS, such as BSS 104a, while residing at a position covered by other access points 102b and 102c or their corresponding BSSs such as BSSs 104b and 104c. The first access point 102a may be regarded as the current access point, while other access points 102b and 102c may be regarded as candidate access points. The first BSS 104a, may be regarded as the current BSS, while the other BSSs 104b and 104c may be regarded as candidate BSSs.

The evaluation system 400 may evaluate current access point or BSS adequacy, compare the data rate of the current access point or BSS to the data rates of candidate access point or BSSs, select a target access point or BSS for roaming based on the comparison, and ultimately make a roaming decision. Once the evaluation system 400 decides to roam to a candidate access point or BSS, such as access point 102*b* or its corresponding BSS 104*b*, the transceiver 208 may then roam from the current access point 102*a* (or its corresponding BSS 104*a*) to the candidate access point 102*b* (or its corresponding BSS 104*b*).

An example evaluation system is described in co-pending application Ser. No. 17/830,537, and entitled System and Method for Wireless Roaming. For instance, with regard to roaming decisions, the system may also evaluate a current connection, evaluate candidate connections, and then make an assessment based on certain criteria. This can include determining a quality score for each connection, and automatically deciding to roam to the connection with the highest quality score. When evaluating the current connection, the system may consider various aspects such as signal strength, system requirements, user needs (e.g., based on the type of application(s) being run), and/or historical connection performance. The user needs may be determined based on the application(s) currently running on the wireless device. For instance, the computing device may have one or more of the following applications in progress: podcast download or media streaming in progress, large file transfer in progress, or cloud gaming in progress. The user needs may affect the quality score of the connection. For instance, podcast download, media streaming and large file transfer may place importance on stability of the connection, causing the quality score to be heavily influenced by connection stability. On the other hand, cloud gaming may place importance on latency of the connection, causing the quality score to be heavily influenced by connection latency. When evaluating candidate connections, similar information may be considered to the extent that it is available for the different connections. Here, there may be little to no historical connection performance information available for certain candidates, because those candidates may not have been used by the wireless device within a certain timeframe (e.g., within the last 12 hours, last 7 days, or other historical timeframe), causing a reduction in their quality scores. Based on these evaluations, the system can assess the advantages and disadvantages of changing from a current connection to a different connection in connection with the prediction approaches described herein. For instance, roaming to a connection that has performed well in the past can carry less downside risk or be less likely to cause an interruption to the user, whereas roaming when an app involves a latency dependent task (e.g., streaming a movie or other content), is more likely to cause a disruption (and hence have higher "risk").

Figure 4B:
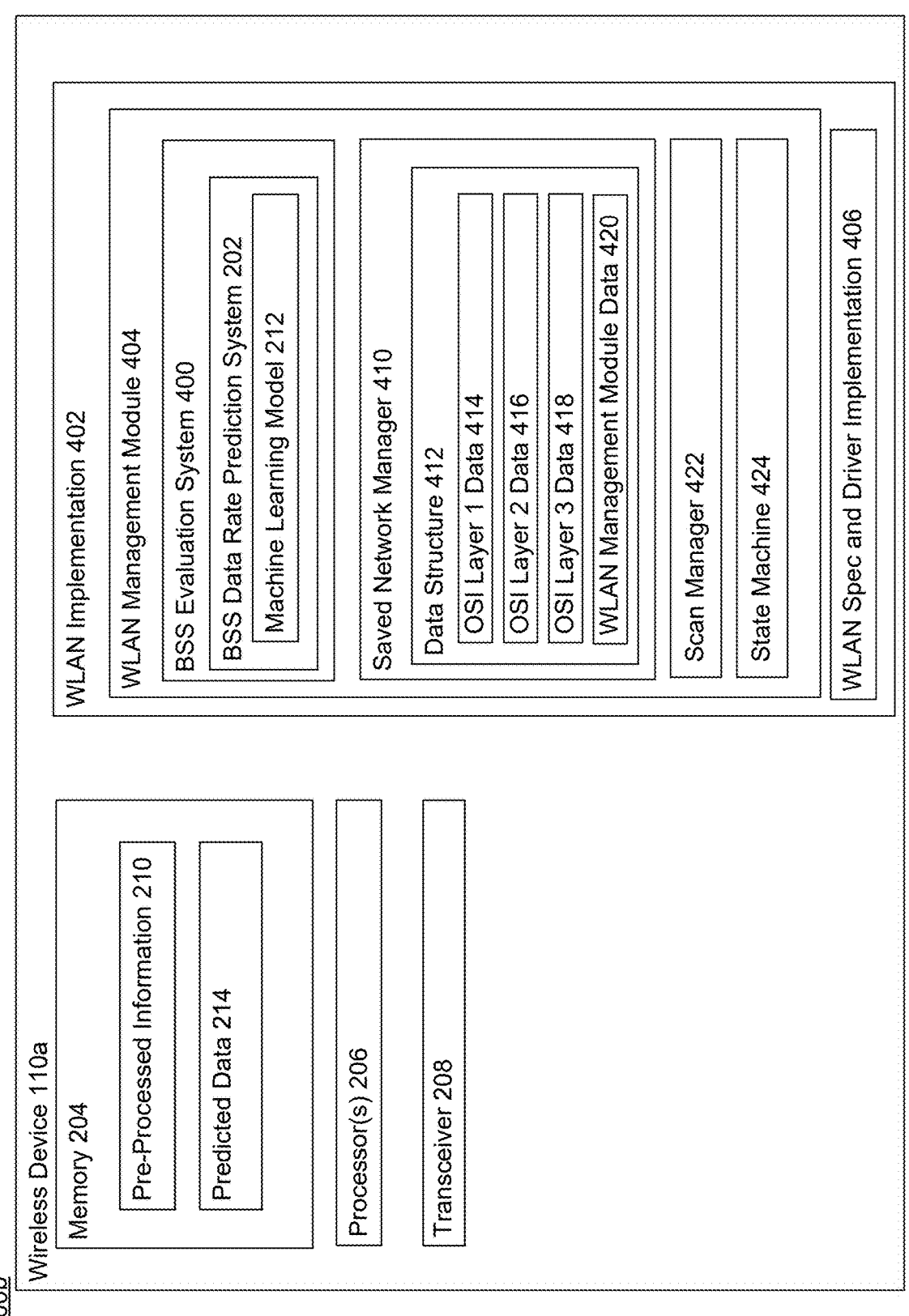
FIG. 4B illustrates another functional diagram of an example wireless device including a system for deciding roaming in accordance with aspects of the disclosure.

In one example 400*b* as illustrated in FIG. 4B, the evaluation system 400 may be part of wireless local area network (WLAN) implementation 402, which may include a WLAN management module 404 and WLAN spec and driver implementation 406. The evaluation system 400 may perform a roam scan or a burst of several active scans to discover any candidate access point or BSS within a communication range of the wireless device 110*a*. The evaluation system 400 may include a scan manager 422 for managing frequency of roam scans. The evaluation system 400 may also include a saved networks manager 410 to keep track of information related to each access point or BSS, including the current access point or BSS as well as each candidate access point or BSS. The saved networks manager 410 may have a data structure 412 (maintained in memory

204) dedicated to each access point or BSS, storing connection quality data associated with each access point or BSS. The connection quality data stored in the data structure 412 may include one or more of the following: data 414 related to layer 1 of open systems interconnection (OSI), data 416 related to OSI layer 2, data 418 related to OSI layer 3, and data 420 related to wireless local area network (WLAN) management module. In the example 400*a* illustrated in FIG. 4A, the data structure 412 may include OSI layer 1 data 414, OSI layer 2 data 416 and OSI layer 3 data 418. In the example 400*b* illustrated in FIG. 4B, the data structure 412 may include OSI layer 1 data 414, OSI layer 2 data 416, OSI layer 3 data 418 and WLAN management module data 420.

The OSI layer 1 data 414 may include physical layer data, including, but not limited to, EWMA signal strength, signal strength velocity, EWMA SNR, channel and channel bandwidth. The OSI layer 1 data 414 may be gathered using scanning. In one example, for the current access point or BSS, the OSI layer 1 data 414 may be obtained by a state machine 424 at the WLAN management module 404 at regular intervals, such as every second. For any candidate access point or BSS, its OSI layer 1 data 414 may be gathered by WLAN management module 404 when the candidate access point or BSS is observed in a roam scan. The evaluation system 400 may do a burst of several active scans targeting some of the candidate access points or BSSs to gather time series data for EWMA and velocity calculations. The state machine may implement a state-based roaming approach as discussed further below.

The OSI layer 2 data 416 may include link-layer data, including, but not limited to, data rate, radio resource management (RRM) reports, and BSS transition management (BTM) indications. The OSI layer 2 data 416 may be gathered from reports provided by the firmware. The RRM reports may contain data for any access points or BSSs that are reported on, such as channel, frequency, among others. The prediction system 202 may rely on data contained in the RRM report to predict the data rate for the candidate access point or BSS.

When the wireless device 110*a* is connected to a current access point or BSS, the data rate for the current access point or BSS may be observed by the state machine 424 and stored in the data structure 412. During the connection, the data rate for the current access point or BSS may vary significantly. For instance, the data rate may drop very low when the wireless device is idle with no data to send. The evaluation system 400 may filter out the idle rates, such that data rates may be only considered when data is actually flowing. Once filtered, the remaining data rate values may then be smoothed using the exponentially weighted moving average (EWMA). Sometimes, measurements may not be obtained at perfect intervals. For example, some of the periodic measurements of data rates may be dropped when the wireless device is idle. As a result, the evaluation system 400 may weigh older data, even if it is the most recent usable data. The evaluation system 400 may use time in the EWMA weight, rather than number of measurements. The amount of weight the new measurement has in the average may be proportional to the time since the measurement was last adjusted.

Based on the above computation, the data structure 412 may store an exponentially weighted moving average physical layer (EWMA PHY) rate for the current access point or BSS, including the exponentially weighted moving average or smoothed transmit physical layer (EWMA TX PHY) rate. The EWMA PHY rate or the EWMA TX PHY rate may be relied on as the data rate of the current access point or BSS when evaluating adequacy of the current access point or BSS, and/or when comparing the current access point or BSS to any candidate access point or BSS during the roaming determination process.

The OSI layer 3 data 418 may include network layer data, such as current Internet reachability, historical Internet reachability and gateway reachability, among other possibilities. The OSI layer 3 data 418 may be primarily gathered through feedback from other system components, including but not limited to netstack and network policy, among other possibilities. In one example, the OSI layer 1 data 414, OSI layer 2 data 416 and OSI layer 3 data 418 may be gathered and/or updated without relying on the WLAN management module 404 or components thereof.

The WLAN management module data 420 may include historical data for each connection, such as, time-to-connect, connection duration, disconnect reason, disconnect signal strength, and average TX PHY rate, among others. The WLAN management module data 420 may be gathered by the state machine 424.

The evaluation system 400 may regularly monitor and update the data structure 412 for each access point or BSS. The state machine 424 may update the data structure 412 for the current access point or BSS 104a periodically. For a candidate access point or BSS, the evaluation system 400 may update its data structures 412 after a roam scan or after receiving an RRM report, if the RRM report contains information related to the candidate access point or BSS. The evaluation system 400 may evaluate adequacy of the current access point or BSS 104a based on its data rate, such as the EWMA PHY rate or the EWMA TX PHY rate described above. For example, if the data rate indicates that the current connection is poor or has a degrading connection quality based on comparison to some tunable threshold, or that the current connection could become poor in the near future, the evaluation system 400 may decide that roaming needs to be considered. An example of a data rate indicating that a connection is poor may be a data rate of 30 Mbps on a connection theoretically capable of 300 Mbps. An example of data rates indicating that a connection is degrading may be the data rate decreasing from 100 Mbps to 75 Mbps to 50 Mbps, and so on. An example tunable threshold may be to consider roaming below 50 Mbps, which could be adjusted up or down.

Once the evaluation system 400 decides that the roaming should be considered, the evaluation system 400 may then evaluate candidate access points or BSSs to identify if there is any candidate access point or BSS that would offer a better connection than the current access point or BSS. If the evaluation system 400 identifies a candidate access point or BSS that is better than the current access point or BSS, the evaluation system 400 may proceed with roaming to the candidate access point or BSS. On the other hand, if no candidate access point or BSS is better than the current access point or BSS, the evaluation system 400 may decide not to roam. The evaluation system 400 may evaluate candidate access points or BSSs based on their predicted data rates generated by the prediction system 202. The prediction system 202 may predict the data rate for each candidate access point or BSS based on data contained in its data structure 412, including but not limited to, signal strength, frequency band, mode, signal strength velocity, signal-to-noise ratio and historical data, among others. The evaluation system 400 may store the predicted data rates for the candidate access point or BSSs in their respective data structures 412.

The evaluation system 400 may compare all access points or BSSs based on their data rates, such as comparing the data rate of the current access point or BSS to the predicted data rates of candidate access points or BSSs. The data rate of the current access point or BSS may refer to the EWMA PHY rate or the EWMA TX PHY rate of the current access point or BSS as discussed earlier. The evaluation system 400 may select the access point or BSS with the highest data rate. If the data rate of the current access point or BSS is greater than the predicted data rate of each candidate access point or BSS, then the current access point or BSS is selected by the evaluation system 400. On the other hand, if the predicted data rate of a candidate access point or BSS is greater than the data rate of the current access point or BSS and also greater than the predicted data rate of each remaining candidate access point or BSS, then the candidate access point or BSS with the highest predicted data rate is selected by the evaluation system 400. Once an access point or BSS is selected, if that access point or BSS is the current access point or BSS, then the evaluation system 400 may continuously maintain connection with the current access point or BSS, and decide not to roam anywhere. On the other hand, if the selected access point or BSS is a candidate access point or BSS, not the current access point or BSS, then the evaluation system 400 may initiate a roam to the selected candidate access point or BSS.

FIG. 5 presents a flow chart depicting an example process for making a roaming decision. At 502, one or more processors 206 may determine whether to consider roaming when the wireless device 110a is connected to a current access point or BSS, e.g., by implementing a BSS evaluation system. The wireless device may be within a network coverage area of a plurality of access points or BSSs. The plurality of access points or BSSs may include the current access point or BSS and at least one candidate access point or BSS. At 504, the processor(s) 206 may predict a data rate for each candidate access point or BSS prior to forming a network connection with the candidate access point or BSS, e.g., by implementing a BSS data rate prediction system. The predicted data rate may estimate a rate at which data is transferred from the wireless device to the candidate access point or BSS once the network connection is formed. At 506, the processor(s) 206 may compare a data rate of the current access point or BSS to the data rate of each candidate access point or BSS to select a target access point or BSS with a highest data rate. At 508, the processor(s) 206 may determine to roam from the current access point or BSS to the target access point or BSS when the target access point or BSS is not the current access point or BSS.

The processor(s) 206 may instruct the transceiver 208 to roam from the current access point or BSS to the target access point or BSS when the target access point or BSS is not the current access point or BSS. The processor(s) 206 may predict the data rate for each candidate access point or BSS based on at least one physical and link layer measurement associated therewith. The at least one physical and link layer measurement may include one or more of the following: signal strength, frequency band, mode, signal strength velocity, SNR and historical data. The processor(s) 206 may perform a roam scan to gather the at least one physical and link layer measurement for each of the at least one candidate access point. The processor(s) 206 may determine whether to consider roaming by comparing the data rate of the current access point or BSS to a threshold. The memory 204 may store pre-processed information indicating a relationship between a data rate and at least one physical and link layer measurement detected at the time when the data rate is determined. The processor(s) 206 may predict the data rate for each candidate access point or BSS based on at least one physical and link layer measurement associated therewith and the pre-processed information.

FIG. 6 presents a flow chart illustrating another example process for determining roaming. At 602, the memory 204 may record data associated with each of a plurality of access points or BSSs that are within a communication range of the wireless device 110*a*. The plurality of access points or BSSs may include the current access point or BSS that the wireless device 110*a* is connected to and at least one candidate access point or BSS. At 604, one or more processors 206 may determine a data rate for the current access point or BSS. At 606, the processor 206 may determine whether to consider roaming by evaluating the data rate of the current access point or BSS. At 608, the processor 206 may predict a data rate for each of the at least one candidate access point or BSS prior to forming a network connection with the candidate access point or BSS. The processor(s) 206 may predict the data rate for each candidate access point or BSS based on at least one physical and link layer measurement of the candidate access point or BSS. The predicted data rate may estimate a rate at which data is transferred from the wireless device to the candidate access point or BSS once the network connection is formed. At 610, the processor 206 may select a target access point or BSS with a highest data rate from the plurality of the access points or BSSs. At 612, the processor 206 may determine to roam from the current access point or BSS to the target access point or BSS when the target access point or BSS is not the current access point or BSS.

In another embodiment, instead of relying on the data rates of access points or BSSs, the evaluation system 400 may perform an access point or BSS evaluation and making roaming decisions by ranking access points or BSSs based on connection quality data stored in the data structure 412 of each access point or BSS. The evaluation system 400 may rank all access points or BSSs including the current access point or BSS and all candidate access points or BSSs based on their connection quality data, and select the access point or BSS with the highest rank. If the current access point or BSS has the highest rank, then the current access point or BSS is selected by the evaluation system 400. If the selected access point or BSS is the current access point or BSS, then the evaluation system 400 may not initiate roaming. If the selected access point or BSS is not the current access point or BSS, then evaluation system 400 may initiate a roam to the selected access point or BSS. In one embodiment, the data structure 412 of each access point or BSS may include its historical ranking record.

FIG. 7 presents a flow chart illustrating yet another example process for determining roaming. At 702, the memory 204 may record connection quality data associated with each of a plurality of access points or BSSs. At 704, one or more processors 206 may determine whether to consider roaming when the wireless device 110*a* is connected to a current access point or BSS. At 706, the processor 206 may rank the plurality of access points or BSSs based on their recorded connection quality data. At 708, the processor 206 may select a target access point or BSS with a highest rank from the plurality of the access points or BSSs. And at 710, the processor 206 may determine to roam from the current access point or BSS to the target access point or BSS when the target access point or BSS is not the current access point or BSS.

Figure 8:
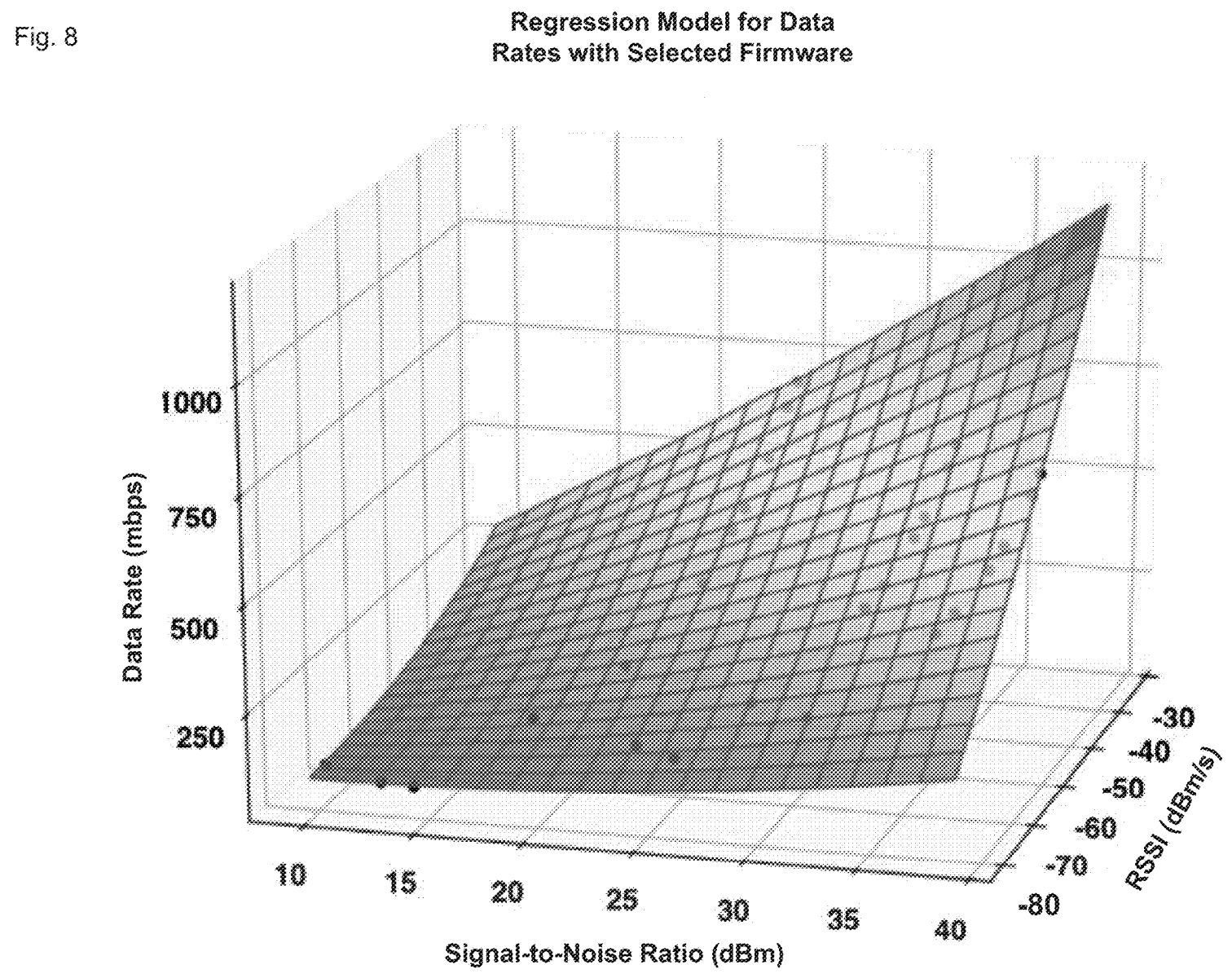

As noted above, according to one aspect the model(s) may employ multivariate non-linear regression. FIG. 8 illustrates an example visualization 800 for a non-linear multivariate regression model with two independent variables. This visualization plots the data rate along a first axis, the signal-to-noise ratio along a second axis, and a received signal strength indication (RSSI) along a third axis perpendicular to the other two axes. As shown, the higher the RSSI and higher the signal-to-noise ratio, the higher the potential data rate. Given the RSSI and signal-to-noise ratio observed for an access point or BSS, this model could be used to predict the data rate that would be achieved by connecting to that access point or BSS.

9. Example System Components

The memory 204 may be databases that store information accessible by the processor(s) 206, including, but not limited to: instructions and data (e.g., to implement modules for the prediction system 202 and/or the evaluation system 400) that may be executed or otherwise used by the processor(s). The memory may be of any type capable of storing information accessible by the processor(s), including a computing device-readable medium. The memory may be a non-transitory computer readable medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processor(s) 206 may be any conventional processors, such as commercially available GPUs, CPUs, TPUs, etc. Alternatively, each processor may be a dedicated device such as an ASIC or other hardware-based processor. Although FIG. 2 functionally illustrates the processors' memory as being within the same block, such devices may actually include multiple processors, computing devices, or memories that may or may not be stored within the same physical housing. Similarly, the memory may be a hard drive or other storage media located in a housing different from that of the processor(s). Accordingly, references to a processor or computing device will be understood to include references to a collection of processors or computing devices or memories that may or may not operate in parallel.

Each wireless device 110*a-g* may include one or more components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users. Example wireless devices include, but not limited to, a mobile phone, a laptop, a wearable computing device (e.g., a smartwatch or a head-mounted display), a smart home device such as a smart display or a speaker, a desktop PC, among other possibilities. Each wireless device may be mobile or stationary.

Each BSS 104a-c may support a network. The network may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computing devices, such as modems and wireless interfaces.

10. Example State-Based Roaming Approach

Figure 9:
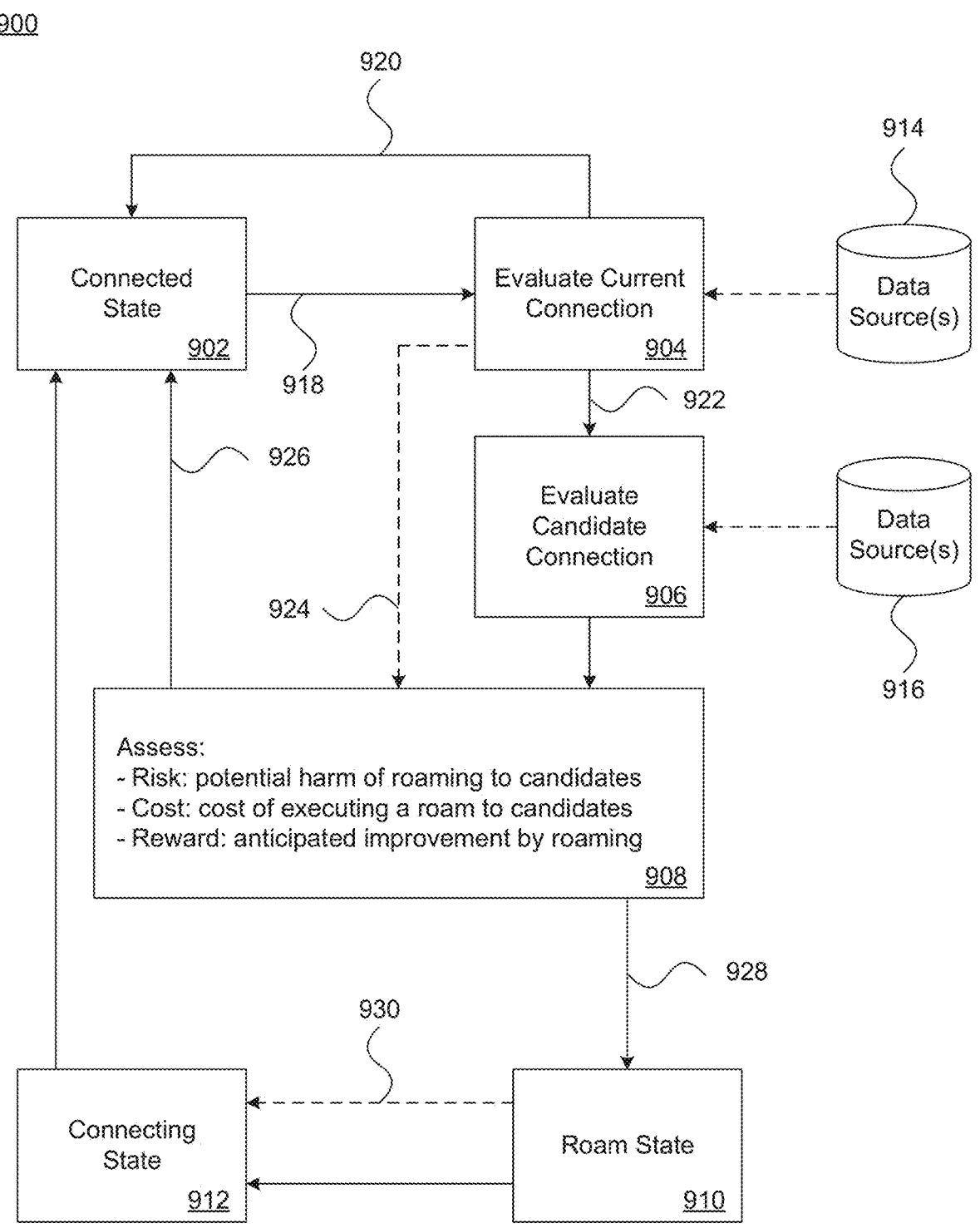
FIG. 9 illustrates an example state-based roaming approach in accordance with aspects of the disclosure.

FIG. 9 illustrates an example 900 of a state-based roaming approach that can be employed by state machine 224 executed by the processor(s) 206. Here, the solid boxes indicate different states, the containers indicate data sources, the solid arrows indicate state transitions, and the dashed arrows indicate data flow. The states include connected state 902, evaluate current connection state 904, evaluate candidate connections state 906, assess state 908, roam state 910 and connecting state 912. Data source 914 provides data to the evaluate current connection state 904, and data source 916 provides data to the evaluate current connection state 906.

While in the connected state 902, the station (client device) is wireless connected to a serving BSS (e.g., BSS 104a of FIG. 1) via access point 102a. One or more other BSSs (e.g., BSSs 104b and 104c of FIG. 1) may be suitable roaming candidates. As shown by arrow 918, periodically such as every N seconds or upon a particular conditional event (e.g., a signal), the state may transition to the evaluate current connection state 904. Here, data from data source 914 is evaluated. This data may include one or more of signal data, data rates, reachability information, a system requirement(s), etc. Upon determination that the current connection is adequate, the state returns to the connected state 902 as shown by arrow 920.

Upon determination that the current connection is inadequate, as shown by arrow 922 the state transitions to the evaluate connected connections state 906. Here, data from data source 916 is evaluated. This data may include one or more scan signal data, historical data, BTM indications, etc. Upon evaluation, the state machine proceeds to the assess state 908, with the data flow including the current connection evaluation and roam reasons, if applicable, as shown by dashed arrow 924. At block 908, the assessment may evaluate potential harm of roaming to candidate access points or BSSs and anticipated improvement by roaming, such as described in the various scenarios and examples above. Here, if the system (e.g., BSS evaluation system 202 of FIG. 2) determines that roaming is not currently the best option, then the state returns to the connected state 902 as shown by arrow 926.

However, when it is determined that roaming is currently the best option, then the state transitions to roam state 910 as shown by arrow 928. Once roaming is complete, the state transitions to the connecting state 912, which includes selected roaming candidate data as shown by dashed arrow 930. From here, using the roaming candidate data, the state will enter the connection state 902.

11. Example Machine Learning Training Architecture

Training may be performed on one or more tensor processing units (TPUs), CPUs or other computing architectures in order to implement the models discussed herein.

Figure 10A:
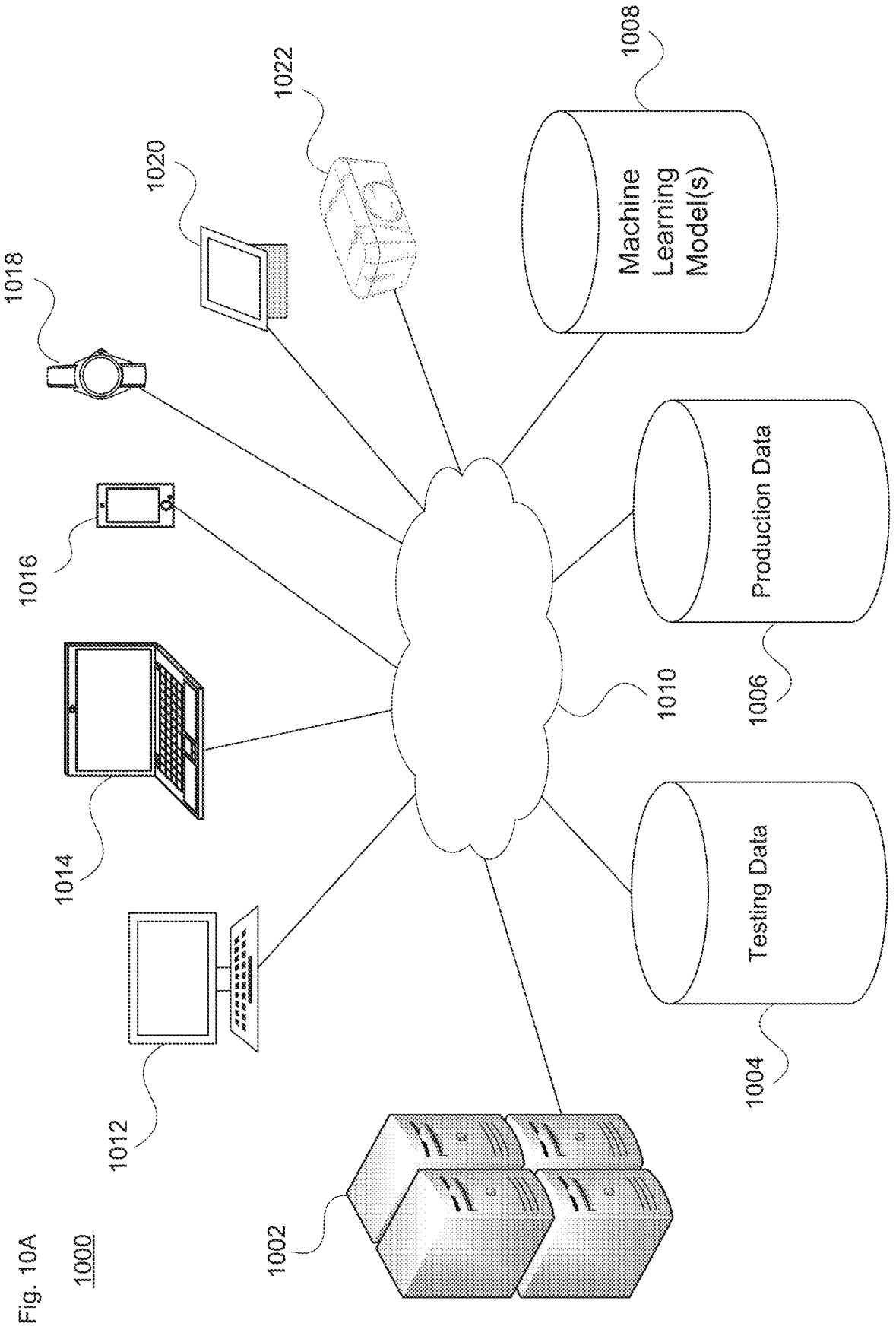
FIGS. 10A-B illustrate a system for use with aspects of the technology.
Figure 10B:
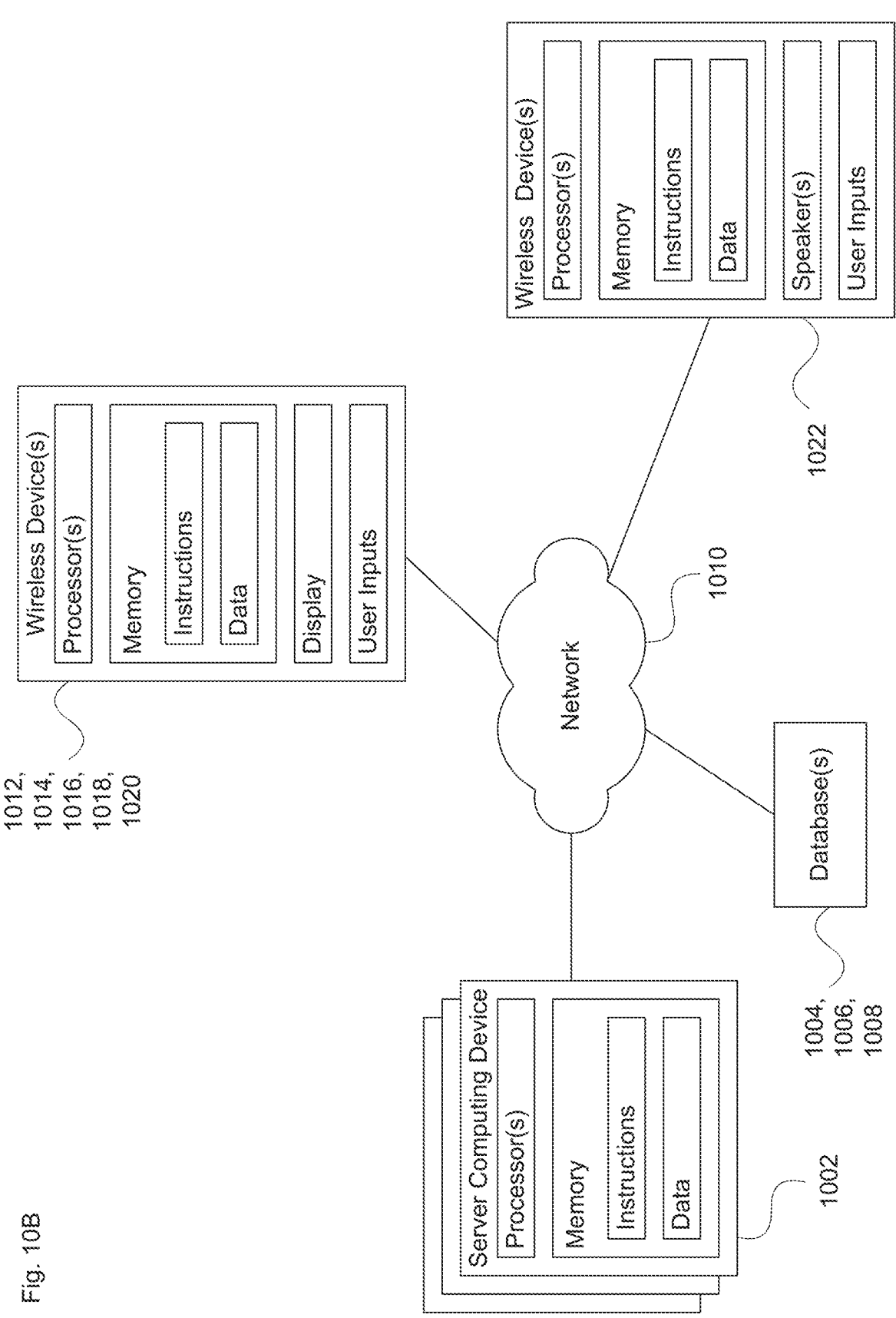

According to one aspect, the model(s) 212 may be a multivariate non-linear regression model(s). One example computing architecture is shown in FIGS. 10A and 10B. In particular, FIGS. 10A and 10B are pictorial and functional diagrams, respectively, of an example system 1000 that includes a plurality of computing devices and databases connected via a network. For instance, computing device(s) 1002 may be a cloud-based server system. Databases 1004, 1006 and 1008 may store, e.g., the testing data, production data and/or trained machine learning models, respectively. The server system may access the databases via network 1010. Wireless devices in the field may gather the production data and may receive the trained model(s) may include one or more of a desktop computer 1012, a laptop or tablet PC 1014, a mobile phone 1016, a smartwatch or other wearable device 1018, an in-home assistant device 1020 and/or a smart speaker 1022. These devices are merely exemplary.

As shown in FIG. 10B, each of the computing devices 1002 and 1012-1022 may include one or more processors, memory, data and instructions. The memory stores information accessible by the one or more processors, including instructions and data (e.g., machine learning models) that may be executed or otherwise used by the processor(s). The memory may be of any type capable of storing information accessible by the processor(s), including a computing device-readable medium.

The devices 1002 and 1012-1020 may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users. Devices such as smart speaker 1022 may not have a display screen, or may only use LEDs or other lights to visually present information to a user.

The wireless devices 1012-1022 may communicate with a back-end computing system (e.g., server 1002) via one or more networks, such as network 1010. The network and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1002 may include one or more server computing devices that are capable of communicating with any of the computing devices 1012-1022 via the network 1010, e.g., to receive production data from those devices and to share the model(s) once they are trained.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A network selection method, comprising:
receiving, by one or more processors of a wireless device, a radio resource management report for each of a plurality of access points, each access point providing wireless network coverage to a location of the wireless device;
selecting, by the one or more processors, one or more machine learning models in a prediction system to predict a data rate for each access point prior to forming a network connection with the access point, and to calculate a score for each access point based on the predicted data rate, the predicted data rate estimating a rate at which data is transferred from the wireless device to the access point once the network connection is formed;
selecting, by the one or more processors, an access point from the plurality of access points based on a comparison of the scores of the plurality of access points, wherein the score of the selected access point corresponds to a highest score of the plurality of access points; and
instructing a transceiver of the wireless device to form a connection with the selected access point.

2. The method of claim 1, further comprising:
performing a roam scan to gather the radio resource management report for each of the plurality of access points,
wherein predicting the data rate for each access point is based on the radio resource management report for each access point.

3. The method of claim 1, wherein the radio resource management report includes one or more of: signal strength, frequency band, mode, signal strength velocity, signal-to-noise ratio or historical data.

4. The method of claim 1, further comprising storing, in memory of the wireless device, pre-processed information indicating a relationship between a given data rate and the radio resource management report detected at a time when the given data rate is determined.

5. The method of claim 4, wherein the data rate for each access point is predicted based on the radio resource management report associated therewith and the pre-processed information.

6. The method of claim 4, wherein the one or more machine learning models are trained on the pre-processed information, the pre-processed information including testing data and production data.

7. The method of claim 1, wherein the predicted data rate approximates a data rate selected by a firmware of the wireless device, the data rate being selectable when the network connection is formed with the selected access point.

8. The method of claim 1, wherein the wireless device is connected to a current access point, and the method further comprising:

determining a current data rate at which data is transferred from the wireless device to the current access point;
comparing the predicted data rate to the current data rate; and
instructing the transceiver of the wireless device to form the connection with the selected access point when the predicted data rate is higher than the current data rate.

9. The method of claim 1, wherein the one or more machine learning models adjust the score of one or more of the plurality of access points based on whether the wireless device is positioned outdoors or indoors.

10. A method for determining roaming of a wireless device, comprising:
determining, by one or more processors of the wireless device, whether to consider roaming when the wireless device is connected to a current access point, the wireless device being within a network coverage area of a plurality of access points, the plurality of access points including the current access point and at least one candidate access point;
selecting, by the one or more processors, one or more machine learning models in a prediction system to predict a data rate for each candidate access point prior to forming a network connection with a selected one of the at least one candidate access point, the predicted data rate estimating a rate at which data would be transferred from the wireless device to each respective candidate access point once the network connection is formed;
comparing, by the one or more processors, a data rate of the current access point to the predicted data rate for each candidate access point to select a target access point; and
determining, by the one or more processors, to roam from the current access point to the target access point when the target access point is not the current access point.

11. The method of claim 10, further comprising roaming, by a transceiver of the wireless device, from the current access point to the target access point when the target access point is not the current access point.

12. The method of claim 10, wherein the data rate for each of the at least one candidate access point is predicted based on a radio resource management report associated therewith.

13. The method of claim 12, wherein the radio resource management report includes one or more of: signal strength, frequency band, mode, signal strength velocity, signal-to-noise ratio or historical data.

14. The method of claim 12, further comprising:
performing a roam scan to gather the radio resource management report for each of the at least one candidate access point.

15. The method of claim 10, wherein determining whether to consider roaming includes comparing the data rate of the current access point to a threshold.

16. The method of claim 10, further comprising storing, in memory of the wireless device, pre-processed information indicating a relationship between a given data rate and a radio resource management report detected at a time when the given data rate is determined.

17. The method of claim 16, wherein the one or more machine learning models are trained on the pre-processed information, the pre-processed information including testing data and production data.

18. The method of claim 16, wherein the data rate for each of the at least one candidate access point is predicted based on the radio resource management report associated therewith and the pre-processed information.

19. The method of claim 10, wherein determining whether to consider roaming includes evaluating at least one of the following: signal strength of the current access point, a system requirement of the wireless device, an application currently running on the wireless device, and historical connection performance.

20. A wireless device within a network coverage area of a plurality of access points, comprising:

a prediction system;

a transceiver; and one or more processors operatively coupled to the transceiver, the one or more processors being configured to:

receive a radio resource management report for each of the plurality of access points;

control the prediction system to select one or more machine learning models in a prediction system used to predict a data rate for each access point prior to forming a network connection with the access point, and to calculate a score for each access point based on the predicted data rate, the predicted data rate estimating a rate at which data is transferred from the transceiver to the access point once the network connection is formed;

select an access point from the plurality of access points based on a comparison of the scores of the plurality of access points, wherein the score of the selected access point corresponds to a highest score of the plurality of access points; and instruct the transceiver to form a wireless connection with the selected access point.

21. The wireless device of claim 20, wherein the one or more processors are further configured to:

perform a roam scan to gather the radio resource management report for each of the plurality of access points, wherein the selected one or more machine learning models predict the data rate for each access point based on the radio resource management report for each access point.

22. The wireless device of claim 21, wherein the radio resource management report includes one or more of: signal strength, frequency band, mode, signal strength velocity, signal-to-noise ratio or historical data.

23. A wireless device within a network coverage area of a plurality of access points, comprising:

a prediction system;

a transceiver; and one or more processors operatively coupled to the transceiver, the one or more processors being configured to:

determine whether to consider roaming when the transceiver is connected to a current access point of the plurality of access points, the plurality of access points including the current access point and at least one candidate access point;

control the prediction system to select one or more machine learning models used to predict a data rate for each candidate access point prior to forming a network connection with a selected one of the candidate access points, and to calculate a score for each access point based on the predicted data rate, the predicted data rate estimating a rate at which data would be transferred from the transceiver to each respective candidate access point once the network connection is formed;

compare a data rate of the current access point to the predicted data rate for each candidate access point to select a target access point; and determine to roam from the current access point to the target access point when the target access point is not the current access point.

24. The wireless device of claim 23, wherein the one or more processors are further configured to instruct the transceiver to roam from the current access point to the target access point when the target access point is not the current access point.

25. The wireless device of claim 23, wherein the selected one or more machine learning models are configured to predict the data rate for each of the at least one candidate access point based on a radio resource management report associated therewith.

* * * * *